(12) United States Patent
El Defrawy et al.

(10) Patent No.: US 10,181,049 B1
(45) Date of Patent: Jan. 15, 2019

(54) METHOD AND APPARATUS FOR SECURE AND PRIVACY-PRESERVING QUERYING AND INTEREST ANNOUNCEMENT IN CONTENT PUSH AND PULL PROTOCOLS

(71) Applicant: HRL Laboratories, LLC, Malibu, CA (US)

(72) Inventors: Karim El Defrawy, Santa Monica, CA (US); Gavin D. Holland, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 229 days.

(21) Appl. No.: 14/084,586

(22) Filed: Nov. 19, 2013

Related U.S. Application Data

(63) Continuation-in-part of application No. 13/749,683, filed on Jan. 25, 2013, now Pat. No. 9,009,089.

(60) Provisional application No. 61/591,207, filed on Jan. 26, 2012, provisional application No. 61/728,420, filed on Nov. 20, 2012.

(51) Int. Cl.
*G06F 11/30* (2006.01)
*G06F 21/62* (2013.01)

(52) U.S. Cl.
CPC .............................. *G06F 21/6227* (2013.01)

(58) Field of Classification Search
CPC ...... G06F 21/6227; G06F 21/72; G06F 21/62; G06F 21/6218; G06F 2221/2107; G06F 17/30864; H04L 9/008; H04L 9/085; Y10S 707/00031
See application file for complete search history.

(56) References Cited

U.S. PATENT DOCUMENTS

| | | | |
|---|---|---|---|
| 7,085,418 B2 | 8/2006 | Kaneko et al. |
| 7,599,894 B2 | 10/2009 | Owechko et al. |
| 7,787,474 B2 | 8/2010 | Van Lunteren |
| 8,068,431 B2 | 11/2011 | Varadarajan et al. |

(Continued)

OTHER PUBLICATIONS

Alfred V. Aho and Margeret J. Corasick. Efficient string matching: an aid to bibliographic search. Commun. ACM, 18:333-340, Jun. 1975.

(Continued)

*Primary Examiner* — David Garcia Cervetti
*Assistant Examiner* — Carlton Johnson
(74) *Attorney, Agent, or Firm* — Tope-McKay & Associates

(57) ABSTRACT

Described is a process for secure and privacy-preserving data retrieval operations in a network having a plurality of nodes. The process includes receiving a query at a querying node. The query is encrypted to generate an encrypted metadata query record. The encrypted metadata query record is transmitted to each queried node that is to be searched for data. A secure pattern matching protocol is used to search a database of metadata records to match a query answer to the metadata query record. The query answer is then encrypted. A query policy is verified for the querying node, with the encrypted answer being further encrypted based on the query policy. The further encrypted answer is transmitted to the querying node, which removes the outer layer of encryption, resulting in the original encrypted answer. The original encrypted answer is then decrypted to recover the query answer.

16 Claims, 9 Drawing Sheets

(56) References Cited

U.S. PATENT DOCUMENTS

| | | | | |
|---|---|---|---|---|
| 2005/0027837 | A1* | 2/2005 | Roese | H04L 41/0893 709/223 |
| 2006/0161559 | A1* | 7/2006 | Bordawekar | G06F 17/2247 |
| 2007/0140479 | A1* | 6/2007 | Wang | H04L 9/008 380/30 |
| 2008/0243770 | A1* | 10/2008 | Aasman | G06F 17/30587 |
| 2009/0119518 | A1* | 5/2009 | Staddon | G06F 21/6227 713/193 |
| 2010/0076919 | A1 | 3/2010 | Chen et al. | |
| 2010/0146299 | A1* | 6/2010 | Swaminathan | G06F 17/30666 713/189 |
| 2013/0157692 | A1* | 6/2013 | Hall | H04L 12/1845 455/456.3 |
| 2014/0121990 | A1 | 5/2014 | Baldi et al. | |

OTHER PUBLICATIONS

Marina Blanton and Mehrdad Aliasgari. Secure outsourcing of dna searching via finite automata. In 24th annual IFIP WG 11.3 working conference on Data and applications security and privacy (DBSec'10), pp. 49-64, 2010.

Taher El Gamal. A public key cryptosystem and a signature scheme based on discrete logarithms. In Proceedings of CRYPTO 84 on Advances in cryptology, pp. 10-18, New York, NY, USA, 1985. Springer-Verlag New York, Inc.

Ronald Cramer, Rosario Gennaro, and Berry Schoenmakers. A secure and optimally efficient multi-authority election scheme. pp. 103-118. Springer-Verlag, 1997.

Ivan Damgård, Efficient concurrent zero-knowledge in the auxiliary string model. In Proceedings of the 19th international conference on Theory and application of cryptographic techniques, EUROCRYPT'00, pp. 418-430, Berlin, Heidelberg, 2000. Springer-Verlag.

Ivan Damgård and Mats Jurik. A generalisation, a simplification and some applications of paillier's probabilistic public-key system. In Proceedings of the 4th International Workshop on Practice and Theory in Public Key Cryptography: Public Key Cryptography, PKC '01, pp. 119-136, London, UK, 2001, Springer-Verlag.

Ivan Damgård and Claudio Orlandi. Multiparty computation for dishonest majority: from passive to active security at low cost. In Proceedings of the 30th annual conference on Advances in cryptology, CRYPTO'10, pp. 558-576, Berlin, Heidelberg, 2010. Springer-Verlag.

Jens Groth and Yuval Ishai. Sub-linear zero-knowledge argument for correctness of a shuffle. In Nigel Smart, editor, Advances in Cryptology—EUROCRYPT 2008, vol. 4965 of Lecture Notes in Computer Science, pp. 379-396. Springer Berlin / Heidelberg, 2008.

O. Goldreich, S. Micali, and A. Wigderson. How to play any mental game. In Proceedings of the nineteenth annual ACM symposium on Theory of computing, STOC '87. pp. 218-229, New York, NY, USA, 1987. ACM.

Juan A. Garay, Philip MacKenzie, and Ke Yang. Strengthening zero-knowledge protocols using signatures. In Proceedings of the 22nd international conference on Theory and applications of cryptographic techniques. EUROCRYPT'03, pp. 177-194, Berlin, Heidelberg, 2003. Springer-Verlag.

Carmit Hazay, Rosario Gennaro, and Jeffery Sorensen. Automata evaluation and text search protocols with simulation based security. In Public Key Cryptography, pp. 145-160, 2010.

Heiko Hoffmann, Michael Howard, and Michael Daily. Fast pattern matching with time-delayed neural networks. In International Joint Conference on Neural Networks (to appear), 2011.

Carmit Hazay and Yehuda Lindell. Efficient protocols for set intersection and pattern matching with security against malicious and covert adversaries. In Proceedings of the 5th conference on Theory of cryptography, TCC '08, pp. 155-175, Berlin, Heidelberg, 2008. Springer-Verlag.

Carmit Hazay and Tomas Toft. Computationally secure pattern matching in the presence of malicious adversaries. In ASIACRYPT, pp. 195-212. 2010.

Yuval Ishai, Manoj Prabhakaran, and Amit Sahai. Founding ctyptography on oblivious transfer—efficiently. In Proceedings of the 28th Annual conference on Cryptology: Advances in Cryptology, CRYPTO 2008, pp. 572-591, Berlin, Heidelberg, 2008. Springer-Verlag.

Jonathan Katz and Lior Malka. Secure text processing with applications to private dna matching. In Proceedings of the 17th ACM conference on Computer and communications security, CCS '10, pp. 485-492, New York, NY, USA. 2010. ACM.

Knuth, Donald; Morris, James H., jr; Pratt, Vaughan (1977). "Fast pattern matching in strings". SIAM Journal on Computing 6(2): 323-350.

Richard M. Karp and Michael O. Rabin. Efficient randomized pattern-matching algorithms. IBM J. Res. Dev., 31:249-260, Mar. 1987.

K. Namjoshi and G. Narlikar. Robust and feast pattern matching for intrusion detection. In INFOCOM, 2010 Proceedings IEEE, pp. 1-9, Mar. 2010.

Pascal Paillier. Public-key cryptosystems based on composite degree residuosity classes. In Proceedings of the 17th international conference on Theory and application of cryptographic techniques, EUROCRYPT'99, pp. 223-238, 1999.

Torben P. Pedersen. Non-interactive and information-theoretic secure verifiable secret sharing. In Proceedings of the 11th Annual International Cryptotogy Conference on Advances in Cryptology, CRYPTO '91, pp. 129-140, London, UK, 1992. Springer-Verlag.

Structural joins; A primitive for efficient xml query pattern matching. In Proceedings of the 18th International Conference on Data Engineering, ICDE '02, pp. 141-, Washington, DC, USA, 2002. IEEE Computer Society.

Claus-Peter Schnorr. Efficient identification and signatures for smart cards. In Proceedings of the 9th Annual International Cryotology Conference on Advances in Cryptology, CRYPTO '89, pp. 239-252, London, UK, UK, 1990. Springer-Verlag.

Juan Ramón Troncoso-Pastoriza, Stefan Katzenbeisser, and Mehmet Celik: Privacy preserving error resilient dna searching through oblivious automata. In Proceedings of the 14th ACM conference on Computer and communications security, CCS'07, pp. 519-528, New York, NY, USA, 2007. ACM.

Tsung-Hsi Tsai. Average case analysis of the boyer-moore algorithm. Random Struct. Algorithms, 28:481-498, Jul. 2006.

Andrew C, Yao. Protocols for secure computations. In Proceedings of the 23rd Annual Symposium on Foundations of Computer Science, SFCS '82, pp. 160-164, Washington, DC, USA, 1982, IEEE Computer Society.

Andrew Chi-Chih Yao. How to generate and exchange secrets. In Proceedings of the 27th Annual Symposium on Foundations of Computer Science, pp. 162-167, Washington, DC, USA, 1986. IEEE Computer Society.

Joshua Baron, Karim El Defrawy, Kirill Minkovich, Rafail Ostrovsky, and Eric Tressler. 5PM: Secure Pattern Matching. Security and Cryptography for Networks. Lecture Notes in Computer Science, vol. 7485, pp. 222-240, 2012.

Baruch Awerbuch, Reza Curtmola, David Holmer, Herbert Rubens, and Cristina Nita-Rotaru. On the survivability of routing protocots in ad hoc wireless networks. In In Proc. of SECURECOMM05. IEEE, pp. 327-338. IEEE Computer Society Press, 2005.

Joshua Baron, Karim El Defrawy, Kirill Minkovich, Rafail Ostrovsky, and Eric Tessler. 5pm: Secure pattern matching. In 8th Conference on Security and Cryptography for Networks (SCN), 2012.

Mario Cagalj, Srdjan Capkun, and Jean-Pierre Hubaux. Key Agreement in Peer-to-Peer Wireless Networks. Proceedings of the IEEE (Special issue on Security and Cryptography), 94(2), 2006.

Gavin D. Holland, Nitin H. Vaidya, and Paramvir Bahl. A rate-adaptive MAC protocol for multi-hop wireless networks. pp. 236-251, Rome, Italy, Aug. 2001.

C. Danilov T. Henderson J. Ahrenholz and J.H. Kim. Core: A real-time network emulator. In IEEE MILCOM Conference, 2008.

Van Jacobson, Diana K. Smetters, James D. Thornton, Michael F. Plass, Nicholas H. Briggs, and Rebecca L. Braynard. Networking named content. In Proceedings of the 5th international conference on Emerging networking experiments and technologies, CoNEXT '09, pp. 1-12, New York, NY, USA, 2009, ACM.

(56) References Cited

OTHER PUBLICATIONS

Jongmin Jeong, Ted Kwon, and Yanghee Choi. Host-oblivious security for content-based networks. In Proceedings of the 5th International Conference on Future Internet Technologies, CFI '10, pp. 35-40, New York, NY, USA, 2010. ACM.
Lalana Kagal and Joe Pato. Preserving privacy based on semantic policy tools. IEEE Security & Privacy, 8(4):25-30, 2010.
Yongdae Kim, Adrian Perrig, and Gene Tsudik. Tree-based group key agreement. ACM Trans. Inf. Syst. Secur., 7:60-96, Feb. 2004.
Tobias Lauinger. Security & Scalability of Content-Centric Networking. PhD thesis, TU Darmstadt, Darmstadt, Germany. 2010.
Michael Meisel, Vasileos Pappas, and Lixia Zhang. Ad hoc networking via named data. In Proceedings of the Fifth ACM Workshop on Mobility in the Evolving Inernet Architecture (MobiArch), Sep. 2010.
Soon-Young Oh, Davide Lau, and Mario Gerla. Content centric networking in tactical and emergency manets. In Wireeless Days, pp. 1-5, 2010.
Pascal Paillier. Public-key cryptosystems based on composite degree residuosity classes. In Proceedings of the 17th international conference on Theory and application of cryptographic techniques, EUROCRYPT'99, pp. 223-238, Berlin, Heideiberg, 1990. Springer-Verlag.
Panos Papadimitratos. Martin Poturalski, Patrick Schaller, Pascal Lafourcade, David Basin, Srdjan Capkun, and Jean pierre Hubaux. Secure neighborhood discovery: A fundamental element for mobile ad hoc networking. IEEE Communications Magazine, 2008.
Adi Shamir. How to share a secret. Commun. ACM, 22:612-613. Nov. 1979.
D Smetters and V. Jacobson. Securing network content. Technical report, PARC, 2009.
Ion Stoica, Robert Morris, David Karger, M. Frans Kaashoek, and Hari Balakrishnan. Chord: A scalable peer-to-peer lookup service for internet applications. SIGCOMM Comput. Commun. Rev., 31:149-160, Aug. 2001.
Shouhuai Xu and Srdjan C' apkun. Distributed and secure bootstrapping of mobile ad hoc networks: Framework and constructions. ACM Trans. Inf. Syst. Secur., 12:2:1-2:37, Oct. 2008.
Amos Beimel, Secret-sharing schemes: A survey, Technical report, 2011.
Notice of Allowance for U.S. Appl. No. 13/749,683, dated Dec. 10, 2014.
Erik Hjelmvik & Wolfgang John, "Statistical Protocol IDentification with SPID: Preliminary Results". SNCNW'09: 6th Swedish National Computer Networking Workshop, Uppsala, Sweden, pp. 1-5, May 4, 2009 <http://spid.sourceforge.net/sncnw09-hjelmvik_john-CR.pdf>.
Martin Roesch; Snort: Lightweight Intrusion Detection for Networks, LISA 1999 <http://dblp.dagstuhl.de/db/conf/lisa/lisa1999.html#Roesch99> : Nov. 7-12, 1999, pp. 229-238.
"Technical Details of I7-filter," Last updated Dec. 9, 2006, pp. 1-2, website http://l7-filter.sourceforge.net/technicaldetails.
Khalife, J., Hajjar, A., & Diaz-Verdejo, J. (Nov. 2011). On the Performance of OpenDPI in Identifying P2P Truncated Flows. In AP2PS 2011, The Third International Conference on Advances in P2P Systems, pp. 79-84.
N. Cascarano, A. Este, F. Gringoli, F. Risso, and L. Salgarelli, "An Experimental Evaluation of the Computational Cost of a DPI Traffic Classifier", Proc. GLOBECOM'09, 2009, pp. 1-8.
Sipser, Introduction to the Theory of Computation. PWS, Boston. ISBN 0-534-94728-X. Section 1.1: Finite Automata, pp. 31-47, 1997.
A V Aho, M J Corasick, Efficient string matching: An aid to bibliographic search. Communications of the ACM, 18(6): pp. 333-340, 1975.
EBayes TCP, Adaptive, Model-based Monitoring for Cyber Attack Detection, Keith Skinner & Alfonso Valdes. Lecture Notes in Computer Science, No. 1907. From Recent Advances in Intrusion Detection (RAID 2000). Edited by H. Debar and L. Me and F. Wu. Springer-Verlag, Toulouse, France. Oct. 2000. pp. 80-92.
K. Koscher, A. Czeskis, F. Roesner, S. Patel, T. Kohno, S. Checkoway, D. McCoy, B. Kantor, D. Anderson, H. Shacham, S. Savage. Experimental Security Analysis of a Modern Automobile. The IEEE Symposium on Security and Privacy, Oakland, CA, May 16-19, 2010, pp. 447-462.
Michael Sipser, Introduction to the Theory of Computation. PWS, Boston. 1997. ISBN 0-534-94728-X. Section 1.1: Finite Automata, pp. 31-47.
W. Maier, et al., "A Minimal Model for the Study of Polychronous Groups," arXiv:0806.1070v1, Condensed Matter. Disordered Systems and Neural Networks, 2008, pp. 1-8.
L. Di Stefano, S. Mattoccia, "A sufficient condition based on the Cauchy-Schwarz inequality for efficient Template Matching", IEEE Int. Conf. on Image Processing (ICIP 2003), Sep. 14-17, 2003, Barcelona, Spain, pp. I-269-I-272.
L. G. Brown, "A survey of image registration techniques," ACM Comput. Surv., vol. 24, No. 4, pp. 325-376, 1992.
J. J. Hopfield, Neural networks and physical systems with emergent collective computational abilities, Proceedings of the National Academy of Sciences of the USA, vol. 79, No. 8, pp. 2554-2558, Apr. 1982.
P Wang, A DeNunzio, P Okunieff, WG O'Dell. Lung metastases detection in CT images using 3D template matching. Med. Phys. 34 (3), pp. 915-922, Mar. 2007.
Luigi di Stefano, Stefano Mattoccia, Federico Tombari, "An Algorithm for Efficient and Exhaustive Template Matching." Jan. 2004; In proceeding of Image Analysis and Recognition: International Conference, ICIAR 2004, Porto, Portugal, Sep. 29-Oct. 1, 2004, Proceedings, Part II. pp. 408-415.
R.S. Boyer, at al., "A fast string searching algorithm," Communications of the ACM. 20; pp. 762-772, 1977.
M. Zubair, et al., "Text scanning approach for exact string matching," International Conference on Networking and Information Technology, 2010, pp. 118-122.
M. Sipser, "Introduction to the Theory of Computation," PWS, Boston, ISBN 0-534-94728-X, Section 1.1; Finite Automata, pp. 31-47, 1997.
W. Maass, et al., "Real-time computing without stable states; a new framework for neural computation based on perturbations," Neural Computation 14(11); pp. 2531-2560, 2002.
A.V. Aho, et al., "Efficient string matching: An aid to bibliographic search," Communications of the ACM, 18(6): pp. 333-340, 1975.
A. Waibel, et al., "Phoneme Recognition Using Time-Delay Neural Networks," IEEE Transactions on Acoustics, Speech, and Signal Porcessing, 37(3): pp. 328-339, 1989.
J.L. Elman, "Finding structure in time," Cognitive Science, 14(2): pp. 179-211, 1990.
E.M. Izhikevich, "Polychroniation: Computation with spikes," Neural Computation, 18(2): pp. 245-282, 2006.
H. Pugam-Moisy, et al., "Delay learning and polychronization for reservoir computing," Neurocomputing, 71 (7-9): pp. 1143-1158, 2008.

* cited by examiner

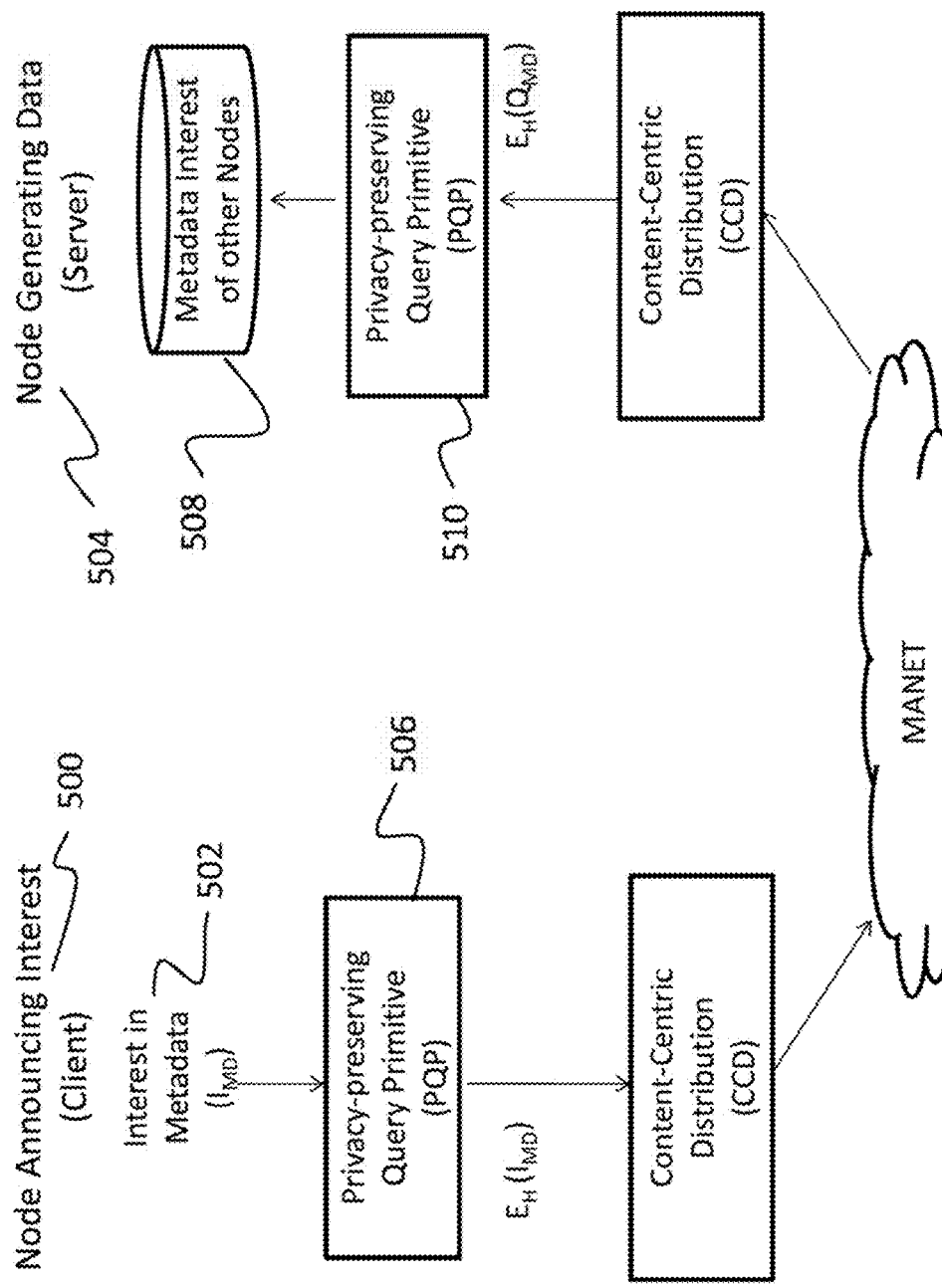

METHOD AND APPARATUS FOR SECURE AND PRIVACY-PRESERVING QUERYING AND INTEREST ANNOUNCEMENT IN CONTENT PUSH AND PULL PROTOCOLS

CROSS-REFERENCE TO RELATED APPLICATIONS

This is a Continuation-in-Part application of U.S. application Ser. No. 13/749,683, filed on Jan. 25, 2013, entitled, "Secure Pattern Matching," which is a non-provisional application of U.S. Provisional Application No. 61/591,207, filed on Jan. 26, 2012, entitled, "Secure Pattern Matching."

This is ALSO a Non-provisional application of U.S. Provisional Application No. 61/728,420, filed on Nov. 20, 2012, entitled, "Methods for Secure and Privacy-Preserving Querying and Interest Announcement in Content Push and Pull Protocols."

BACKGROUND OF THE INVENTION

(1) Field of Invention

The present invention relates to methods for data retrieval operations, and more particularly, to methods for secure and privacy-preserving data retrieval operations suitable for a content-centric networking (CCN) model or other networking models where communication is mainly based on content.

(2) Description of Related Art

The present invention is related to operations suitable for a content-centric networking (CCN) model or other networking models where communication is mainly based on content (as opposed to the traditional host-based communication model adopted in the design of the Internet Protocol (IP))

While there has been some research conducted for CCN protocols, relatively little research has addressed content security, and even less research has been focused on content security within wireless networking environments. In Smetters et al., the authors construct a means to provide integrity, authenticity, and provenance of content using certificates, but their construction relies on the existence of a public key infrastructure (PKI), which is impractical in wireless settings (See the "List of Cited References" below, Literature Reference No. 17). The work by Oh et al. presents solutions to similar problems, and also assumes a key dispersal structure that is nontrivial to accomplish (See Literature Reference No. 13). In his PhD thesis, Tobias Lauinger describes security in terms of denial-of-service (DOS) attacks and protecting cached data, but the work in the thesis is mainly concerned with creating attack strategies and not defending against them (See Literature Reference No. 11). The work by Jeong et al. takes an approach that is host-independent, but it also has similar weaknesses in its key management infrastructure (See Literature Reference No. 8). As evident in the literature, none of the research on content security in CCN provides solutions for the very significant problems of query and content privacy in PUSH and PULL protocols and preventing the exfiltration of sensitive information (content and its metadata, locations, access patterns, etc.) from the network by attacks from captured or compromised nodes.

Thus, a continuing need exists for a method and system for secure and privacy-preserving data retrieval operations suitable for the CNN model or other networking models based on content.

SUMMARY OF INVENTION

The present invention is directed to a process for secure and privacy-preserving data retrieval operations in a network having a plurality of nodes. The process is implemented as a computer program product, a system, and a computer implemented method that results in the performance of a variety of operations. For example, the method causes one or more processors to execute instructions encoded upon a non-transitory memory, such that upon execution, the one or more processors perform operations of receiving a query at a querying node (the query having a metadata query record with a plurality of metadata fields) and homomorphically encrypting the metadata query record to generate a homomorphically encrypted metadata query record. Thereafter, the homomorphically encrypted metadata query record is transmitted to each queried node that is to be searched for data. A secure pattern matching protocol is used to search a database of metadata records to match a query answer to the metadata query record. The query answer is then homomorphically encrypted to generate a homomorphically encrypted answer. A query policy is verified for the querying node, which results in an outer layer of encryption being provided to the homomorphically encrypted answer based on the query policy to generate a further encrypted answer. The further encrypted answer is then transmitted to the querying node, which removes the outer layer of encryption, resulting in the homomorphically encrypted answer. Finally, the homomorphically encrypted answer is decrypted to recover the query answer.

In another aspect, the homomorphically encrypted answer is a table of binary vectors, one per metadata record in the database that indicates whether a record matched the query and a pointer to corresponding data.

In yet another aspect, each node in the network is pre-loaded with a list of query policies for every node in the network, where each query policy is a list of metadata fields in metadata record that a particular node is allowed to query.

Further, in verifying a query policy for the querying node and providing an outer layer of encryption to the homomorphically encrypted answer based on the query policy, the query policy is enforced by performing operations of encrypting the query answer to the query using a one-time session key and using an additive secret sharing scheme, separating the session key into a number of shares equal to or bigger than a number of fields in the node's query policy. For each field, the field's unique symmetric key is then used to encrypt one of the shares, whereby the querying node will only be able to recover the session key and decrypt the result if it has all of the keys for the fields in its query.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5 is a flow chart depicting operation of PUSH-based content retrieval system according to the principles of the present invention, depicting an announcement of interest to other nodes in an interest-based push scenario;

DETAILED DESCRIPTION

Figure 1:
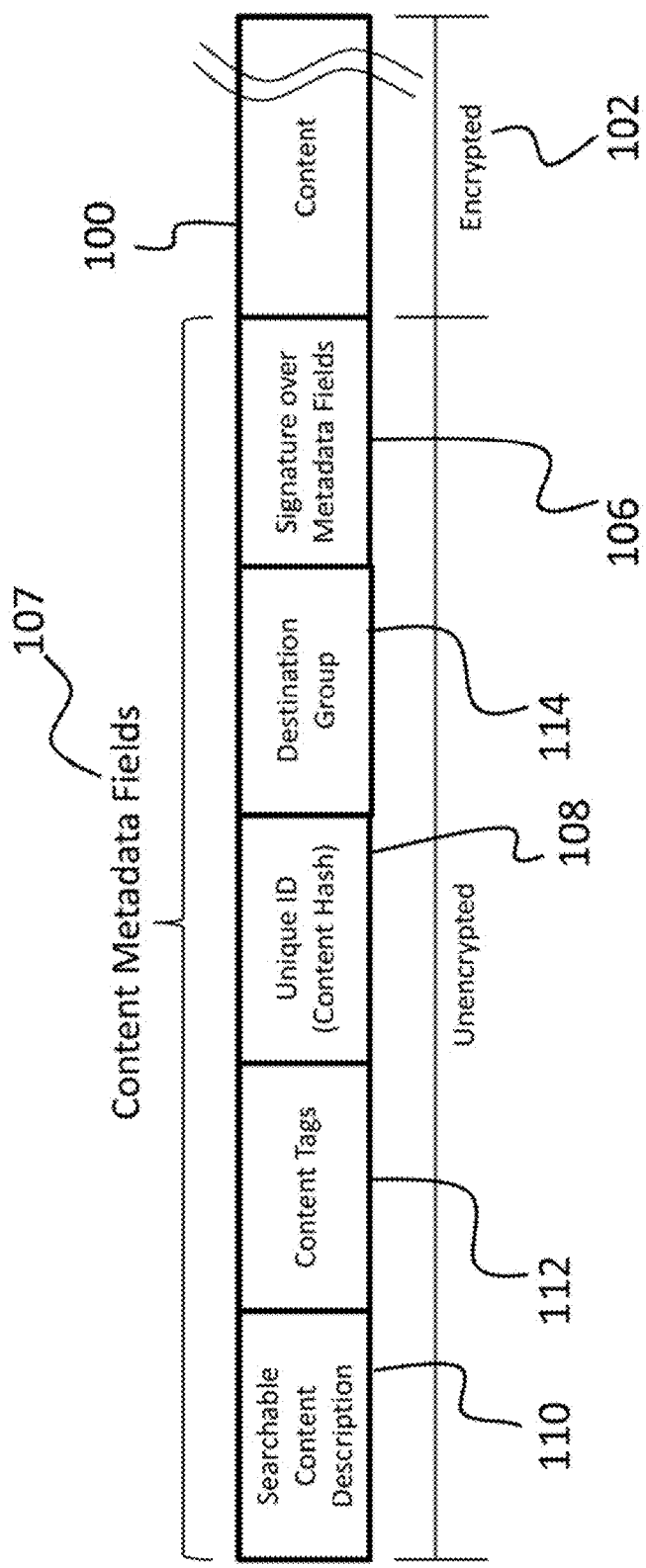
FIG. 1 is an illustration depicting an example of a metadata record format according to the principles of the present invention.

The present invention relates to methods for data retrieval operations, and more particularly, to methods for secure and privacy-preserving data retrieval operations suitable for a content-centric networking (CCN) model or other networking models where communication is mainly based on content. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of various principal aspects of the present invention is provided. Subsequently, an introduction provides the reader with a general understanding of the present invention. Finally, details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding Literature Reference No.

1. Baruch Awerbuch, Reza Curtmola, David Holmer, Herbert Rubens, and Cristina Nita-Rotaru. On the survivability of routing protocols in ad hoc wireless networks. In *IN PROC. OF SECURECOMM05. IEEE*, pages 327-338. IEEE Computer Society Press, 2005.
2. Joshua Baron, Karim El Defrawy, Kirill Minkovich, Rafail Ostrovsky, and Eric Tressier. 5pm: 5ecure pattern matching. In 8*th Conference on Security and Cryptography for Networks (SCN)*, 2012.
3. Mario Cagalj, Srdjan Capkun, and Jean-Pierre Hubaux. Key Agreement in Peer-to-Peer Wireless Networks. *Proceedings of the IEEE (Special Issue on Security and Cryptography)*, 94(2), 2006.
4. Palo Alto Research Center. Project ccnx. Technical report, June 2011.
5. Gavin D. Holland, Nitin H. Vaidya, and Paramvir Bahl. A rate-adaptive MAC protocol for multi-hop wireless networks. pages 236-251, Rome, Italy, August 2001.
6. C. Danilov T. Henderson J. Ahrenholz and J. H. Kim. Core: A real-time network emulator. In *IEEE MILCOM Conference*, 2008.
7. Van Jacobson, Diana K. Smetters, James D. Thornton, Michael. F. Plass, Nicholas H. Briggs, and Rebecca L. Braynard. Networking named content. In *Proceedings of the 5th international conference on Emerging networking experiments and technologies*, CoNEXT '09, pages 1-12, New York, N.Y., USA, 2009. ACM.
8. Jongmin Jeong, Ted Kwon, and Yanghee Choi. Host-oblivious security for content-based networks. In *Proceedings of the 5th International Conference on Future Internet Technologies*, CFI '10, pages 35-40, New York, N.Y., USA, 2010. ACM.
9. Lalana Kagal and Joe Pato. Preserving privacy based on semantic policy tools. *IEEE Security & Privacy*, 8(4):25-30, 2010.
10. Yongdae Kim, Adrian Perrig, and Gene Tsudik. Tree-based group key agreement. *ACM Trans. Inf. Syst. Secur.*, 7:60-96, February 2004.
11. Tobias Lauinger. *Security & Scalability of Content-Centric Networking*. PhD thesis, TU Darmstadt, Darmstadt, Germany, 2010.
12. Michael Meisel, Vasileos Pappas, and Lixia Zhang. Ad hoc networking via named data. In *Proceedings of the Fifth ACM Workshop on Mobility in the Evolving Internet Architecture (MobiArc*h), September 2010.
13. Soon-Young Oh, Davide Lau, and Mario Gerla. Content centric networking in tactical and emergency manets. In *Wireless Days*, pages 1-5, 2010.

14. Pascal Paillier. Public-key cryptosystems based on composite degree residuosity classes. In *Proceedings of the 17th international conference on Theory and application of cryptographic techniques*, EUROCRYPT'99, pages 223-238, Berlin, Heidelberg, 1999. Springer-Verlag.
15. Panos Papadimitratos, Marcin Poturalski, Patrick Schaller, Pascal Lafourcade, David Basin, Srdjan Capkun, and Jean pierre Hubaux. Secure neighborhood discovery: A fundamental element for mobile ad hoc networking. *IEEE Communications Magazine*, 2008.
16. Adi Shamir. How to share a secret. *Commun. ACM*, 22:612-613, November 1979.
17. D. Smetters and V. Jacobson. Securing network content. Technical report, PARC, 2009.
18. Ion Stoica, Robert Morris, David Karger, M. Frans Kaashoek, and Hari Balakrishnan. Chord: A scalable peer-to-peer lookup service for internet applications. *SIGCOMM Comput. Commun. Rev.*, 31:149-160, August 2001.
19. Shouhuai Xu and Srdjan Capkun. Distributed and secure bootstrapping of mobile ad hoc networks: Framework and constructions. *ACM Trans. Inf. Syst. Secur.*, 12:2:1-2:37, October 2008.
20. U.S. application Ser. No. 13/749,683, flied on Jan. 25, 2013, entitled, "Secure Pattern Matching."

(2) Principal Aspects

The present invention has three "principal" aspects. The first is a system (apparatus) for secure and privacy-preserving querying and interest announcement in content push and pull protocols. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

(3) Introduction

In mobile ad-hoc networks (MANETs), the relative ease at which network nodes may be captured and compromised poses significant threats to integrity of the operation of the network as well as to security and privacy of its content, resources, and users. Since cooperation among nodes is vital to operation of MANETs, the conventional approach of erecting a perimeter-based defense must be considered for every node in the network. The compromise of a single node gives even an unsophisticated adversary the ability to attack the entire network with all the authority of an insider.

Thus, the present invention provides solutions that address very important aspects of content protection in MANETs, such as privacy of queries on content metadata, inhibiting queries for unknown content, enforcing a query policy and preventing traffic analysis on content queries, access and distribution patterns. The solutions provided by the present invention are especially relevant to the state-of-the-art in content management in MANETs in that they cover basic operations common among advanced peer-to-peer content dissemination schemes (see Literature Reference No. 18), next generation content-centric networking (CCN) paradigms (see Literature Reference No. 7), as well as more traditional client-server distribution schemes.

In particular, the present invention provides protocols that provide the ability to securely and privately locate content for two of the most common operations used in content dissemination schemes: publish/subscribe (i.e., content "PUSH"), and direct query (i.e., content "PULL"). It should be understood that although the invention described herein discusses the protocols within the context of a notional CCN stack for MANETs, the invention is not intended to be limited thereto as the protocols can be applied to any networking models where communication is based on content. For brevity, a MANET that uses a CCN stack is referred to as a "content-centric MANET." This term is for illustration purposes only, and was selected because of its unique emphasis on content as the focus of network operations, as opposed to the more traditional host-centric view of network operations.

This description is directed to two of the most common modes of content retrieval, PUSH and PULL. In a PUSH protocol, content (e.g., video, images, audio) produced by one node is pushed to one or more other nodes in the network. Alternatively, in a PULL protocol, nodes "subscribe" to content that is "published" by other nodes in the network. The subscribing node need not know exactly what content the publishing node is generating, or where it is stored. Here it is assumed that content, consisting of data and its descriptive metadata, may be stored separately but the metadata is cryptographically bound to its data, (e.g., using public-key signatures, e.g., as described in Literature Reference No. 17). The distribution of the data is managed by the CCN stack (an example of which is described in Literature Reference No. 4) and is indexed by the stack using tables consisting of some form of key/metadata pairings. It is queries on these tables of key/metadata pairs that must be fortified to be secure and privacy-preserving. Thus, the present invention provides secure and privacy-preserving PUSH and PULL operations that can be applied to a variety of networking models, such as being implemented on top of a CCN stack for MANETs.

The protocols allow a wide range of queries to be supported, including exact match, single character wildcards which enable approximate matching, limited numerical range queries, and substring matching. The protocols minimize exposure of content, its whereabouts, and its importance to other nodes (including insiders) through the secure privacy-preserving PUSH and PULL protocols. The protocols rely on secure query and query-compliance protocols as building blocks to prevent unauthorized content requests, to protect against unnecessary exposure of database (cache) contents to querying nodes, to protect against exposure of the queries to nodes holding the databases, and to prevent the use of traffic analysis to identify critical nodes or content.

The specifics of the present invention are provided in further detail below. Specifically, provided below is a description of (A) network, content, and adversary models, and (B) secure and privacy preserving PUSH and PULL protocols.

(4) Specific Aspects of the Invention (4)(A) Network, Content, and Adversary Models For illustrative purposes, this section describes the network and content models that are considered, and example adversaries that the present invention can be used to protect against.

(4)(A)(i) Network and Content Model

Before describing the protocols of the present invention in detail, it is helpful to have an understanding of the network and content model that are applicable to the present invention. For example, the invention can be employed in settings in which a MANET consisting of tens (or hundreds) of nodes is deployed in a "possibly hostile" environment where attacks and node compromises are likely to happen. The MANET is then required to operate autonomously (e.g., for several days or weeks). The following assumptions are made about such a MANET: (1) All nodes are configured by one "offline" administrative entity. This entity initially preloads MANET nodes with required credentials and any data necessary for operation. (2) Each node has a means to determine its location (e.g., using GPS), and nodes are loosely synchronized (e.g., using a GPS clock). (3) All nodes have the same CCN stack and cryptographic software required for their operation. (4) Nodes can be captured and compromised/reprogrammed by an adversary, and protection against both insider and outsider adversaries is required. (5) The communication paradigm is content-centric (i.e., nodes are not interested in communicating to other specific nodes or addresses, instead, they are interested in retrieving certain content no matter where it is generated and/or stored). (6) Generated data content is tagged with descriptive metadata which is how nodes identify and query such data. The data itself is not searchable. Throughout this description, a CCN stack (e.g., see Literature Reference No. 4) is assumed to have the following: (a) mechanisms for indexing content using tables that map content descriptions (i.e., metadata) to content locations, (b) mechanisms for "chunking" content so that it can be distributed in an efficient manner that balances the load on the network and increases robustness and availability, and (c) mechanisms for issuing queries on the index tables to locate content based on, for example, distributed hash tables (DHTs) (e.g., see Literature Reference No. 18) or other techniques (e.g., see Literature Reference No. 4). To better illustrate operation of such a content-centric MANET, consider the following example: A group of individuals are sent out into the field to perform some form of sensitive mission (e.g., patrolling or information gathering in a hostile area), which typically does not last more than a few days. Prior to the mission, all of the handheld nodes are configured, by some administrative entity, as a single, cohesive MANET that will persist only for the duration of the mission. This configuration includes, for example, setting network parameters (e.g., routing protocol timing parameters, addresses), cryptographic certificates and keys, applications, maps, and objectives. The operation of the MANET proceeds as follows. Individuals move around in the field after deployment making observations and collecting data. Any collected data that is deemed important is tagged with some descriptive metadata and forwarded to all of the other individuals in the group. This would constitute a content PUSH operation. Another possible operation would be that an individual makes data available only to anyone that has expressed, in advance, an interest in such data. For instance, the individual may simply store the data and its metadata locally and anybody that is interested may use a CCN-based application to query and retrieve it. Alternatively, instead of storing data locally, the CCN stack may pre-distribute data and metadata to other nodes to enhance performance and availability.

(4)(A)(ii) Adversary Model

For illustrative purposes, the present invention can be described with respect to an honest-but-curious adversary model. An honest-but-curious adversary follows prescribed protocols but tries to infer more information than it should. This is achieved by analyzing received traffic and monitoring traffic that travels through network routes that the adversary is part of (i.e., passive adversary).

(4)(B) Secure and Privacy-Preserving PUSH and PULL Protocols

To understand the PUSH and PULL protocols, it is helpful to have an understanding of the required cryptographic building blocks. Thus, provided below is a brief description of the required cryptographic building blocks, which is followed by a detailed description of the protocols according to the present invention.

(4)(B)(i) Cryptographic Building Blocks

The protocols rely on two cryptographic primitives: (1) additively homomorphic encryption and (2) secret sharing.

1) Additively Homomorphic Encryption:

Such encryption schemes (e.g., the Paillier encryption scheme as described in Literature Reference No. 14) are semantically secure encryption schemes with plaintext space P and ciphertext space C that allow addition under encryption: the addition operation + can be computed on plaintext by defining a corresponding operation ⊞ (typically multiplication) on the ciphertexts which satisfies: $\forall x, y \in P: E(x) \boxplus E(y) = E(x+y)$, where $E(x)$ denotes the encryption of plaintext x. Multiplication by a plaintext constant a is naturally supported by additively homomorphic encryption schemes using exponentiation (repeated applications of ⊞ ): $\forall a \in \mathbb{N}, x \in P: E(x)a = E(ax)$.

2) Secret Sharing:

In a (k+1, n)-threshold secret sharing scheme, an adversary must compromise more than k entities to recover the secret. Shamir's secret sharing (see Literature Reference No. 16) is one of the first and most well-known secret sharing schemes. It works as follows: let q be a prime and $x \in Z_q$ be the secret to be shared, n the number of shares that the secret should be split into, and (k+1) the number of shares required to reconstruct the secret. The dealer, D, of the secret chooses a random polynomial f of degree k over $Z_q$ such that $f(0)=x$. Each share $x_i$ is then computed by D as $f(i)$ and transmitted secretly to participant $P_i$. The reconstruction of the secret is then achieved by having k+1 participants provide their shares and using interpolation to reconstruct the secret as $f(0)=x$.

(4)(B)(ii) PUSH and PULL Protocols (4)(B)(ii)(a) Privacy-Preserving Query Primitive (PQP)

Described are secure and privacy-preserving PUSH and PULL protocols based on what is coined as a privacy-preserving query primitive (PQP). A PQP allows one to construct different types of queries (e.g., exact, approximate, wildcard, and substring matching; and range queries). PQP can be used by a requesting node to query the network and search content that has certain metadata and/or descriptions without revealing what it is searching for. The same protocol can also be used by nodes to securely announce their interest to other nodes and securely know when other nodes generate content with metadata that matches their interest. Secure pattern matching protocols (such as that described in Literature Reference Nos. 2 and 20) that can perform exact, wildcard, and approximate matching provide all necessary querying functionalities required by a PQP. A secure pattern matching protocol is executed between two parties: a Server, holding a text (or record) of length n, and a Client, holding a pattern of length m to be matched against the text. Secure in this context means that Server learns nothing about Client's pattern, and Client learns only whether or not (and possibly where) the pattern matches Server's text. For the rest of this description, it is assumed that the secure pattern matching protocol in Literature Reference No. 2 is utilized as a non-limiting example to implement the required PQP.

(4)(B)(ii)(b) Query Policy Enforcement (QPE)

Ensuring privacy of querying nodes does not prevent them from abusing their querying capabilities to learn extra information about other content stored on other queried nodes. QPE ensures that queries are valid (i.e., they comply with a well-defined set of rules). This prevents captured or compromised nodes from abusing their querying capabilities.

The present invention employs any suitable technique for QPE. As a non-limiting example, the protocol employs a mechanism consisting of a matrix-style permission list of nodes and their corresponding permissible attributes. In this example, for each node, the semantics of the matrix is that a node is only allowed to issue queries within the permitted set of metadata attributes encoded in its row in the permission matrix. Users will be permitted to search only over attributes for which they will have corresponding keys and will not be able to recover an answer to their query if any other attribute for which they do not have permission is utilized in the query.

To implement this form of QPE, the PQP is further modified. This modification guarantees that only if a node has permissions satisfying the query enforcement policy will it be able to decrypt the answer to the query.

The modification to PQP to perform QPE is as follows:
1. Server encrypts a computed query answer with a fresh one-time symmetric key, $K_s$.
2. Split $K_s$ into na shares by utilizing an additive secret sharing scheme (for example, see Literature Reference No. 16). The number of shares na is equal to the number of attributes used in this query.
3. Encrypt each share using the attribute's key and send the encrypted result to the Client. Note that if the user has all the attributes, he/she will be able to decrypt all shares—this in turn guarantees that only if all query attributes are allowed by the query policy permission metric will the user be able to decrypt and recover the message.
4. If the Client is allowed to query the attributes specified in the query, it will be able to decrypt all shares and reconstruct the key—this in turn guarantees that only if all query attributes are allowed by the query policy permission matrix will the Client be able to decrypt and recover the answer to the query.

QPE is essential to ensuring that captured or compromised nodes cannot abuse their querying capabilities. For example, if an adversary captures a node and issues a query that contains wildcards in all metadata attributes that a node can query over, the returned result will be a match against all data in the network. The QPE according to the principles of the present invention mechanism prevents such attacks.

(4)(B)(ii)(c) Details of Secure and Privacy-Preserving PUSH and PULL

This section describes how to construct secure and privacy-preserving PUSH and PULL protocols using the PQP and QPE primitives.

(4)(B)(ii)(c)(1) Content Generation

Based on existing proposals for CCN (see Literature Reference No. 7) it is reasonable to assume that when new content is generated a standard metadata record that contains a description of the content is also generated. The formats and fields in the metadata records are standard across all content in the MANET. The fields in the record are populated automatically by software, and, possibly, entered manually by the user, when content is generated. It is assumed that the metadata record will contain, among other things, a searchable description of the content, some relevant tags, some form of destination group designation, an index used to locate the content, and a globally unique identifier for the content inside the MANET. As shown in FIG. 1, the content 100 is first encrypted 102 using an appropriate key and encryption scheme (preferably symmetric key encryption, such as the Advanced Encryption Standard (AES)) depending on the group designation. To cryptographically bind the metadata 107 to the content 100, a field is added to the metadata to hold a hash 108 of the encrypted content 100. As noted above, other metadata fields include a searchable content description 110, content tags 112, and a designation (i.e., destination) group 114 label. Another signature field 106 is added that contains a signature computed over the complete record, including the content's hash 108 (or unique ID).

The signatures are computed using the generating node's private-key. Each node is preloaded with the certificates for every other node in the network prior to a mission. Once encryption, signing, and binding are complete, the content 100 and metadata 107 are passed to the CCN content distribution stack for storage and distribution in the network. Since metadata is unencrypted, its distribution should be limited to the minimum number of nodes necessary for efficient dissemination. This reduces the amount of information that a compromised node will be able to learn about available content without the involvement of other nodes in the network. Content itself remains encrypted throughout the distribution process. The group designation 114 is an identifier that the CCN content distribution system maintains and knows how to use to map to the list of recipient nodes.

(4)(B)(ii)(c)(2) On-Demand PULL-Based Content Retrieval

Figure 2:
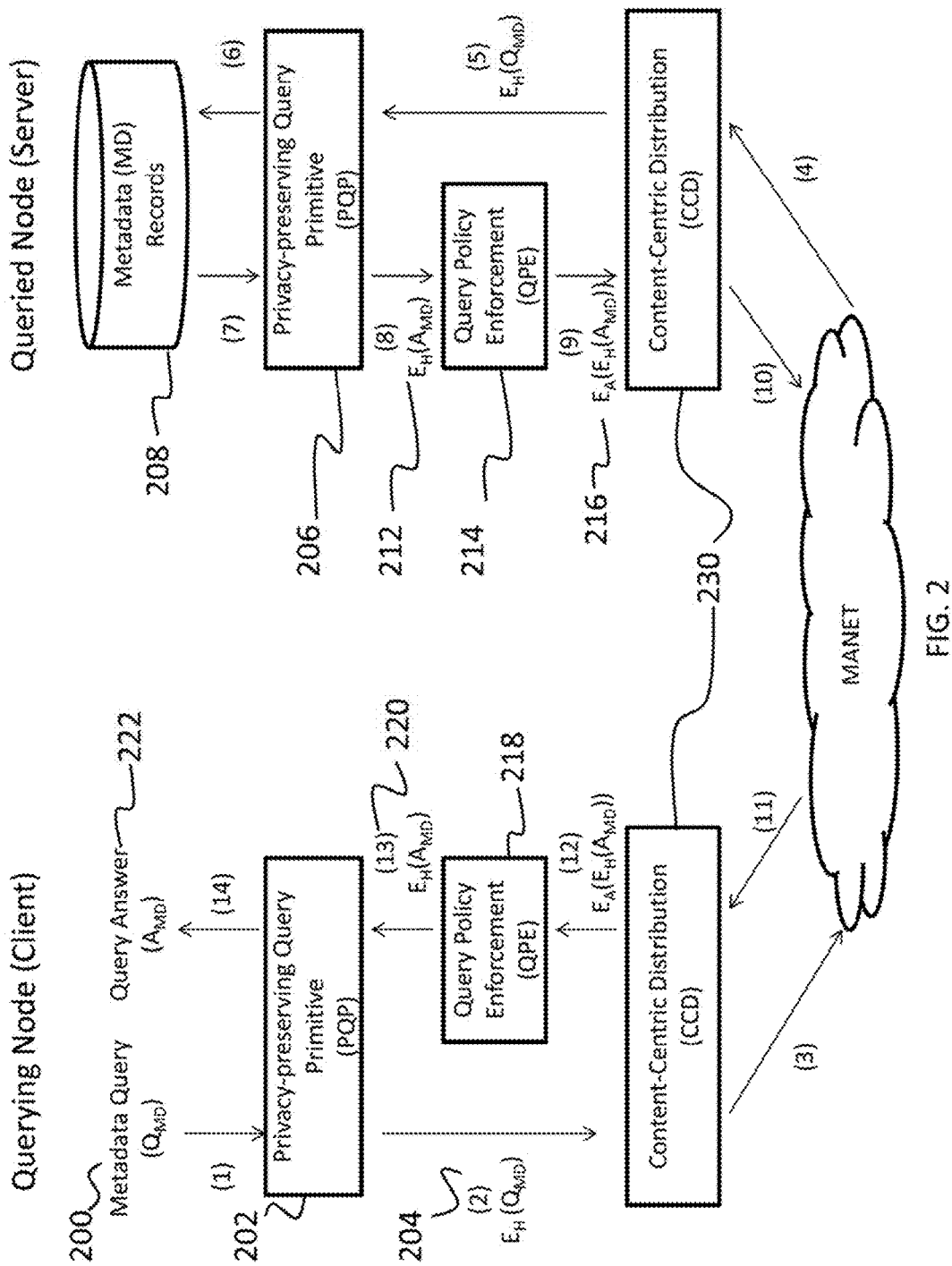
FIG. 2 is a flow chart depicting operation of a PULL-based content retrieval system according to the principles of the present invention.

As shown in FIG. 2, the protocol for the on-demand PULL mode of content retrieval is as follows:
1. A structured metadata query record ($Q_{MD}$) 200 is populated automatically by software or manually by the user (the querying node or Client) with the desired search parameters for the desired content. The structure of the query is defined by PQP, which supports a fixed set of queries designed to minimize search overhead while still providing a rich set of search options (see the discussion above regarding Privacy-Preserving Query Primitive (PQP)).
2. Step (1) of FIG. 2. The completed query record is then homomorphically encrypted by the PQP module 202 to generate a homomorphically encrypted metadata query record ($E_H(Q_{MD})$) 204. To further enhance privacy, it is desirable for the content distribution module of the CCN stack to incorporate randomization in the issuance of queries to reduce exposure to attacks based on traffic analysis. Even though the queries are encrypted, an attacker may be able to observe query/response patterns and learn which nodes hold popular metadata records, exposing the node as a target of interest (e.g., for cyber-attacks and physical attacks).
3. Steps (2), (3), (4) and (5) of FIG. 2: The PQP module 202 on the querying node then sends the encrypted query (through the CCD 230) to the PQP module 206 on each receiving node to be searched for data (queried node or Server in FIG. 2). It should be understood that the CCN is a general concept and type of approach to networking, content-centric networking, whereas CCD 230 is whatever content-centric distribution mechanism is used in such a content-centric network/architecture.

4. Steps (6) and (7) of FIG. 2: A receiving PQP module 206 applies the query to its database of metadata records 208 to identify a metadata query answer ($A_{MD}$). The PQP module 206 uses a secure pattern matching protocol based on homomorphic encryption (see, for example, Literature Reference No. 2) to generate a homomorphically encrypted answer $E_H(A_{MD})$. This protocol ensures that the queried node is unable to learn anything about what is being queried about in the database and the outcome of such a query, and the querying node is unable to learn anything about what is in the queried node's database, other than the result of its query. If the pattern matching algorithm of Literature Reference No. 2 is used, then the encrypted result is an encrypted table of binary vectors, one per metadata record in the database that indicates whether the record matched the query and a pointer to the corresponding data (e.g., this encrypted table of binary vector would be the $E_H(A_{MD})$ in FIG. 6).

Figure 3:
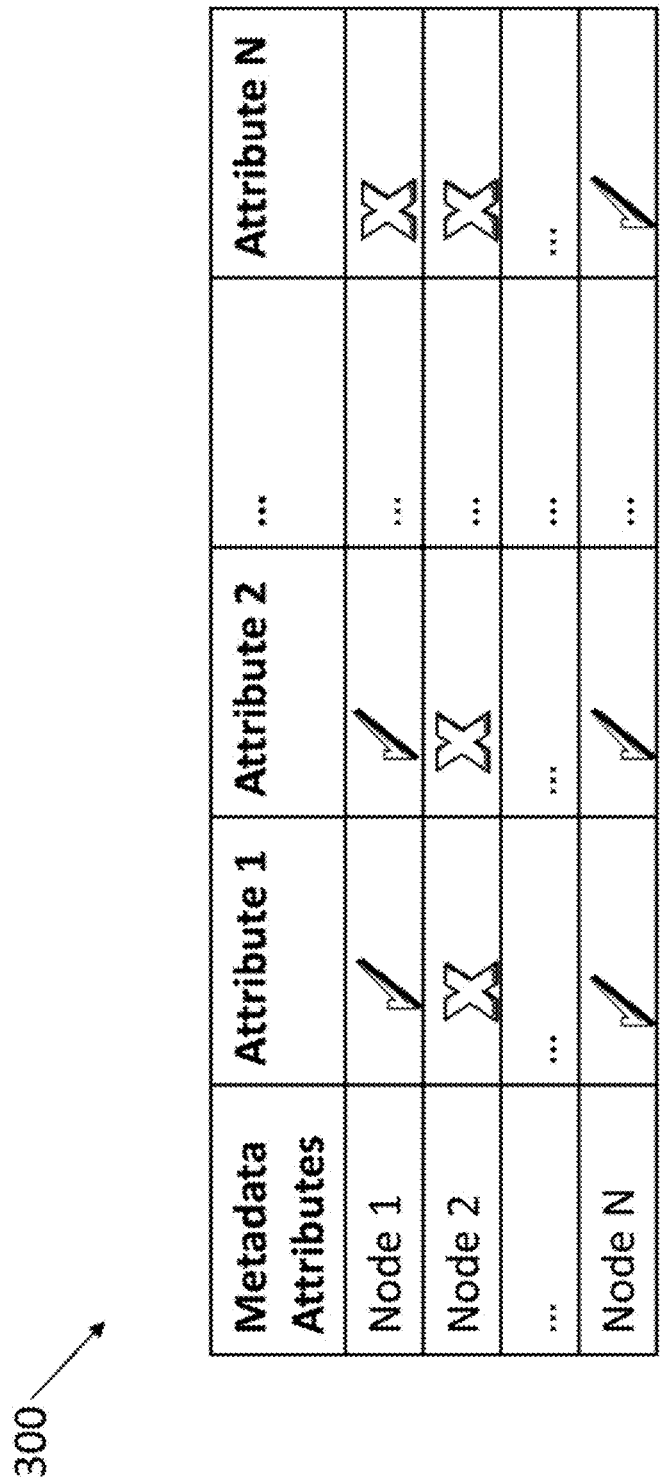
FIG. 3 is a table illustration an example of a query policy matrix according to the principles of the present invention.

5. Step (8) and (9) of FIG. 2: The homomorphically encrypted answer $E_H(A_{MD})$ 212 is then sent by the PQP module 206 to the Server's QPE module 214 which looks up the query policy for the requesting node (via, for example, a query policy matrix 300 as shown in FIG. 3). As illustrated in the non-limiting example of FIG. 3, a query policy is the list of fields (attributes) in metadata records that a node is allowed to query. For example and to clarify, these "attributes" are searchable attributes that correspond to elements 110 and 112 (and elements 108 and 114, if desired, but not element 106) as depicted in FIG. 1. Each node is preloaded with the list of query policies for every node in the network prior to a mission (details provided in the section above regarding Query Policy Enforcement (QPE)).

Figure 4A:
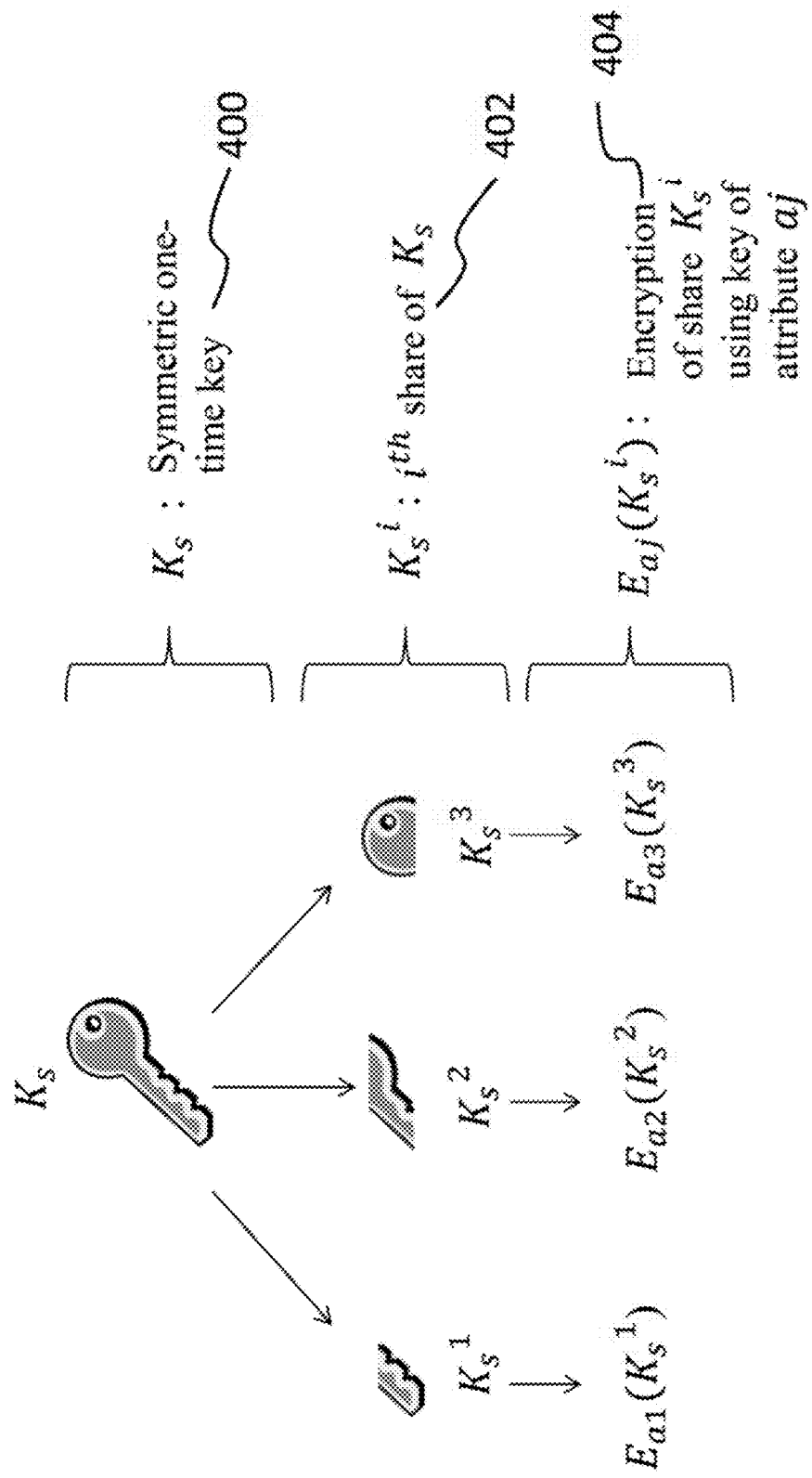
FIG. 4A is an illustration depicting a process of splitting a session key according to the principles of the present invention.
Figure 4B:
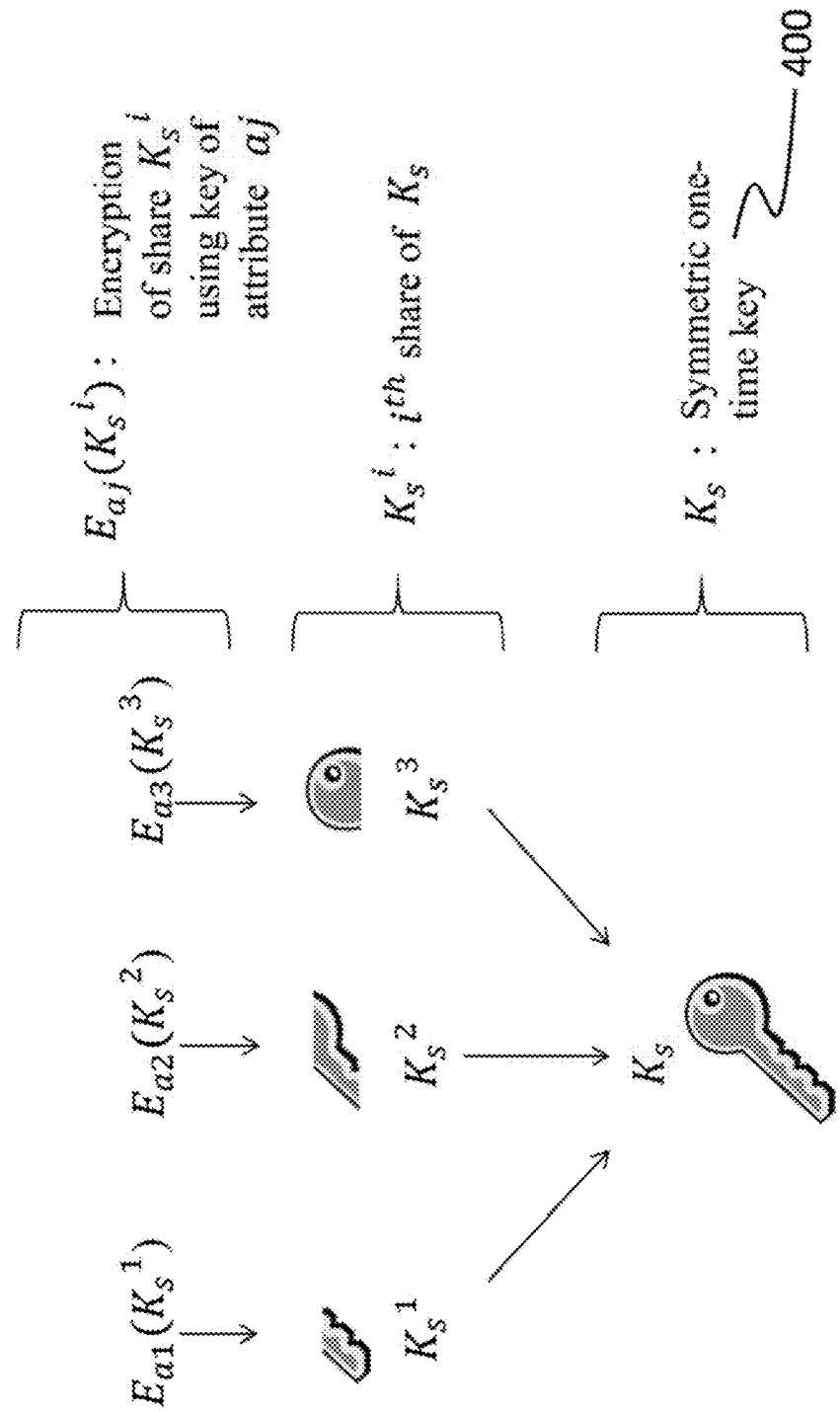
FIG. 4B is an illustration depicting a process of constructing a session key according to the principles of the present invention.

6. The QPE module 214 then enforces the node's query policy by further encrypting the answer in such a way that only if the querying node has privileges to query using the fields in its query, will it be able to decrypt the result. This is achieved by first assigning unique symmetric keys to each field in the metadata record, which are preloaded onto each node according to its query policy. The QPE module 214 encrypts the answer to the query using a one-time session key. As shown in FIG. 4A, this session key 400 is then separated into a number of shares 402 equal to the number of valid fields in the node's query policy, using an additive secret-sharing scheme. For each valid field, the field's unique key is then used to encrypt 404 one of the shares. Thus and as shown in FIG. 4B, the querying node will only be able to recover the session key 400 and decrypt the result if it has all of the keys for the fields in its query. If the number of keys is less than the number of shares, then one key, for example, could be used to encrypt multiple shares.

7. Steps (10), (11) and (12) of FIG. 2: The result, a further encrypted answer ($E_A(E_H(A_{MD}))$) 216 (called symmetric key encryption), is then sent by the QPE module 214 to the Client's QPE module 218. The Client's QPE module 218 recovers the session key and removes the outer layer of encryption on the further encrypted answer, leaving the homomorphically encrypted result, $E_H(A_{MD})$ 220.

8. Steps (13) and (14) in FIG. 2: The QPE module 218 passes the homomorphically encrypted result, $E_H(A_{MD})$ 220, to the PQP module 202. The PQP module 202 decrypts the result, thus recovering the query answer $A_{MD}$ 222. The PQP module 202 also checks to see if one or more matches for its query were found. If so, then it recovers the locations where the data is stored. When a match occurs, the PQP module 202 passes a request to the CCN content distribution software that is addressed to nodes that store the encrypted content chunks pointed to by the metadata that was queried. It is assumed that an encrypted copy of the metadata is also contained with the encrypted content data. Once the encrypted content and metadata are retrieved and decrypted, the signatures in the decrypted metadata record are checked to verify the authenticity and integrity of the metadata and content. Content and its metadata are then passed up to the application or user.

(4)(B)(ii)(c)(3) Proactive PUSH-Based Content Retrieval

There are several approaches with varying performance demands for the proactive PUSH mode of content retrieval. In the direct distribution approach, the PQP module encrypts the metadata using a designated group key, which is the same key that was used to encrypt the content, and both the encrypted and unencrypted metadata are passed to the CCN stack. The encrypted metadata and content are then distributed to all of the members in the group (i.e. Group-Based PUSH). An alternative approach is to limit distribution to only those nodes that have explicitly expressed an interest in the type of content that was generated (i.e., Interest-Based PUSH). These approaches are described in further detail below.

Interest-Based PUSH:

In the interest-based PUSH protocol, distribution is limited to only those nodes that have explicitly expressed an interest in the type of content that was generated. If the interests of every group member are known by the node pushing the content, then it need only consult the list of interests and the group membership list to determine the recipient nodes. This information may then be passed to the CCN content distribution part of the stack. Secure interest-based PUSH can be implemented using the PQP modules and QPE modules, as in the protocols shown in FIGS. 5 and 6. The main difference between the interest-based PUSH and PULL approaches is that in the former, interest in metadata ($I_{MD}$) is generated before the actual data is, while in the latter the query metadata ($Q_{MD}$) is typically generated after data has been generated and is already stored on the generating node.

More specifically and as shown in FIG. 5, a node 500 first announces its interest in metadata, $I_{MD}$ 502, to another node 504. The interest is handled by the PQP module 506 the same way a query is handled in the PULL mode (as shown in FIG. 2), with the metadata interest 508 being stored for later matching.

Figure 6:
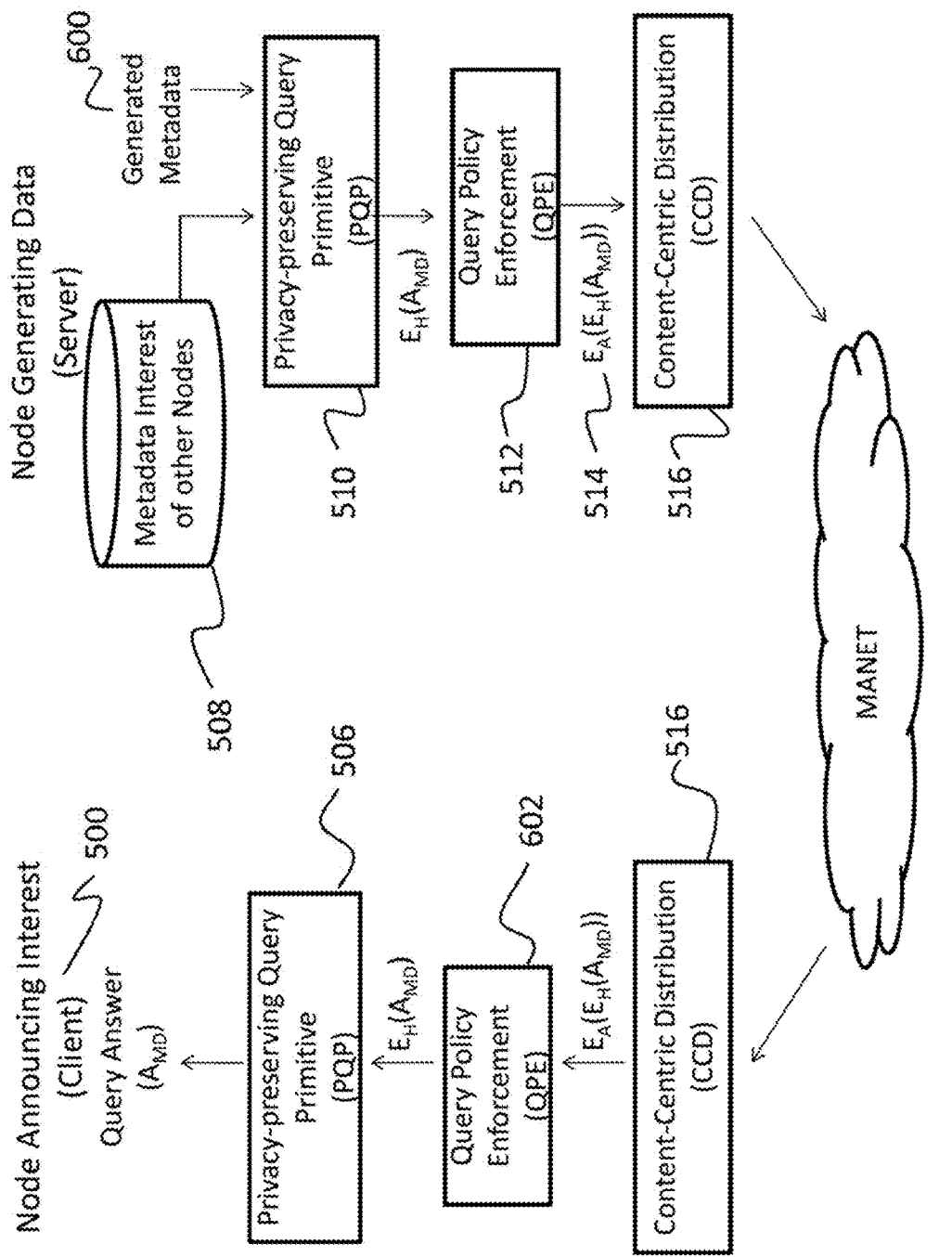
FIG. 6 is a flow chart depicting operation of PUSH-based content retrieval system according to the principles of the present invention, depicting a process of generating data and matching it against interests of other nodes.

As shown in FIG. 6, other nodes then generate data and annotate them with corresponding metadata 600. Each newly generated metadata 600 record is then matched against metadata interests 508 announced by other nodes using the server's PQP module 510 (using similar notation and operation to that in FIG. 2). The result is passed to the QPE module 512 and handled similar to handling results of queries in the PULL approach. The output 514 from the Server's QPE module 512 is then sent through the content distribution software 516 to the Client 500 that announced the corresponding interest (e.g., element 502 of FIG. 5). The Client's QPE module 602 and PQP module 506 perform the same sequence of operations as in the PULL approach described above. If there is a match, data will be retrieved identically to the method used in the PULL approach.

Group-Based PUSH:

In the Group-Based PUSH approach, the generating node's CCN stack encrypts the metadata using the designated group key, which is the same key that was used to encrypt the content, and both the encrypted and unencrypted metadata are passed to the CCN content distribution module of the stack. The encrypted metadata and content are then distributed to all group members. It should be noted that the group formation can be accomplished using any suitable technique. For example, it is assumed that MANET nodes are either preloaded with group membership information or use any group establishment protocols (e.g., employees only, etc.) to dynamically form such groups.

Figure 7:
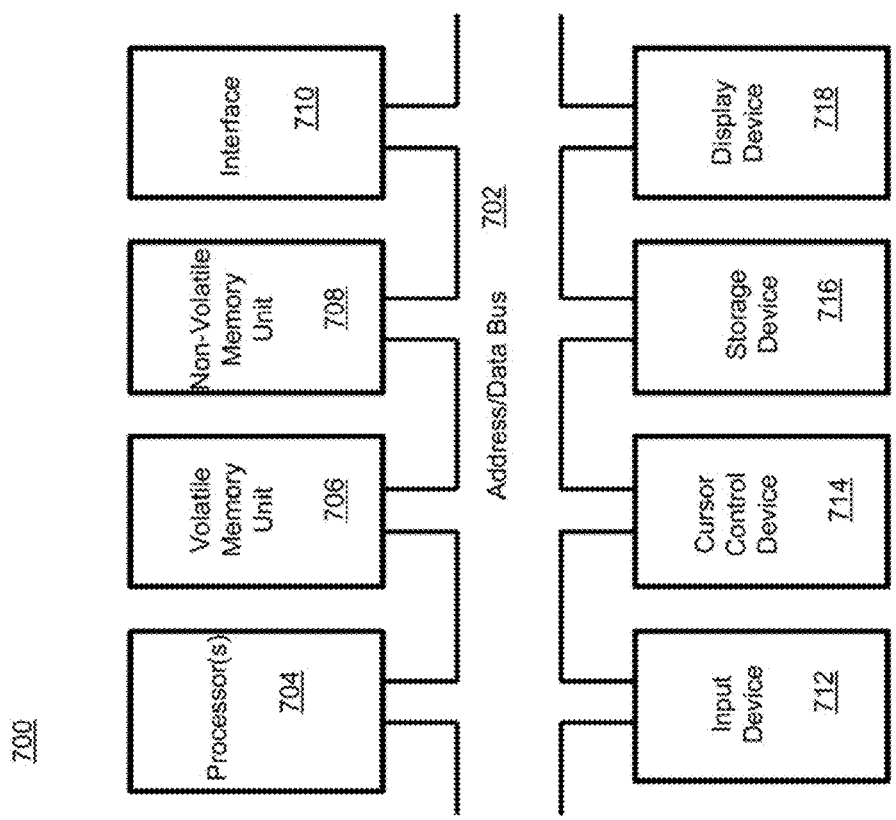
FIG. 7 is an illustration depicting a typical automated data processing system that may be used to implement the principles of the present invention.

An exemplary computer system 700 in accordance with an embodiment is shown in FIG. 7. Exemplary computer system 700 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of exemplary computer system 700. When executed, the instructions cause exemplary computer system 700 to perform specific actions and exhibit specific behavior, such as described herein.

Exemplary computer system 700 may include an address/data bus 710 that is configured to communicate information. Additionally, one or more data processing unit, such as processor 720, are coupled with address/data bus 710. Processor 720 is configured to process information and instructions. In an embodiment, processor 720 is a microprocessor. Alternatively, processor 720 may be a different type of processor such as a parallel processor, or a field programmable gate array.

Exemplary computer system 700 is configured to utilize one or more data storage units. Exemplary computer system 700 may include a volatile memory unit 730 (e.g., random access memory ("RAM"), static RAM, dynamic RAM, etc.) coupled with address/data bus 710, wherein volatile memory unit 730 is configured to store information and instructions for processor 720. Exemplary computer system 700 further may include a non-volatile memory unit 740 (e.g., read-only memory ("ROM"), programmable ROM ("PROM"), erasable programmable ROM ("EPROM"), electrically erasable programmable ROM "EEPROM"), flash memory, etc.) coupled with address/data bus 710, wherein non-volatile memory unit 740 is configured to store static information and instructions for processor 720. Alternatively exemplary computer system 700 may execute instructions retrieved from an online data storage unit such as in "Cloud" computing. In an embodiment, exemplary computer system 700 also may include one or more interfaces, such as interface 750, coupled with address/data bus 710. The one or more interfaces are configured to enable exemplary computer system 700 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplar computer system 700 may include an input device 760 coupled with address/data bus 710, wherein input device 760 is configured to communicate information and command selections to processor 720. In accordance with one embodiment, input device 760 is an alphanumeric input device, such as a keyboard, that may include alphanumeric and/or function keys. Alternatively, input device 760 may be an input device other than an alphanumeric input device. In an embodiment, exemplar computer system 700 may include a cursor control device 770 coupled with address/data bus 710, wherein cursor control device 770 is configured to communicate user input information and/or command selections to processor 720. In an embodiment, cursor control device 770 is implemented using a device such as a mouse, a track-ball, a track-pad, an optical tracking device, or a touch screen. The foregoing notwithstanding, in an embodiment, cursor control device 770 is directed and/or activated via input from input device 760, such as in response to the use of special keys and key sequence commands associated with input device 760. In an alternative embodiment, cursor control device 770 is configured to be directed or guided by voice commands.

In an embodiment, exemplary computer system 700 further may include one or more optional computer usable data storage devices, such as storage device 780, coupled with address/data bus 710. Storage device 780 is configured to store information and/or computer executable instructions. In one embodiment, storage device 780 is a storage device such as a magnetic or optical disk drive (e.g., hard disk drive ("HDD"), floppy diskette, compact disk read only memory ("CD-ROM"), digital versatile disk ("DVD")). Pursuant to one embodiment, a display device 790 is coupled with address/data bus 710, wherein display device 790 is configured to display video and/or graphics. In an embodiment, display device 790 may include a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 700 is presented herein as an exemplary computing environment in accordance with an embodiment. However, exemplary computer system 700 is not strictly limited to being a computer system. For example, an embodiment provides that exemplary computer system 700 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented using computer-executable instructions, such as program modules, being executed by a computer. In one exemplary implementation, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 8:
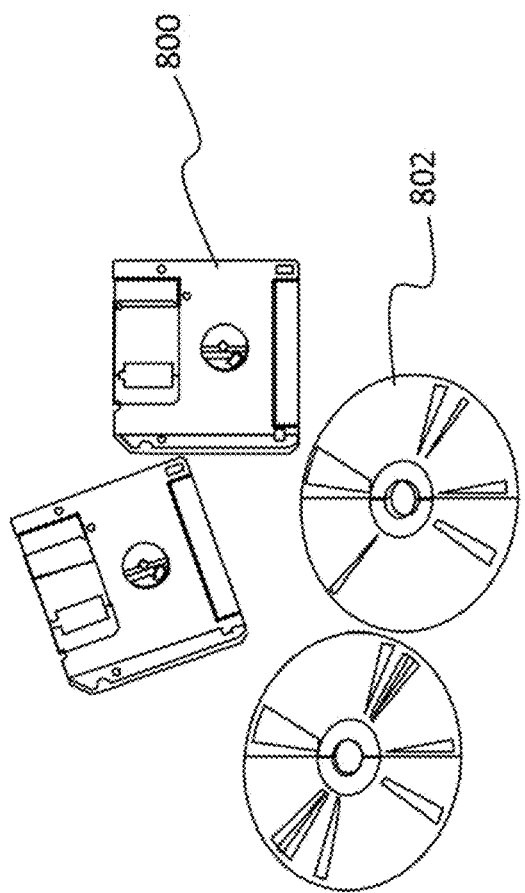
FIG. 8 is an illustration, without implying a limitation, depicting embodiments of non-transitory memory that may contain instructions implementing the principles of the present invention.

An illustrative diagram of a computer program product (i.e., storage device) embodying an aspect of the present invention is depicted in FIG. 8. The computer program product is depicted as floppy disk 800 or an optical disk 802 such as a CD or DVD. However, as mentioned previously, the computer program product generally represents computer-readable instructions stored on any compatible non-transitory computer-readable medium, such as a hard drive or any other memory. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

What is claimed is:

1. A computer implemented method for secure and privacy-preserving data retrieval operations in a network having a plurality of nodes, the method comprising an act of:
   causing one or more processors to execute instructions encoded upon a non-transitory memory, such that upon execution, the one or more processors perform operations of:
      receiving a query at a querying node, the query having a metadata query record with a plurality of metadata fields, and wherein the query is any of an exact query, an approximate query, a wildcard query, a substring matching query, and a range query;
      homomorphically encrypting the metadata query record to generate a homomorphically encrypted metadata query record;
      transmitting the homomorphically encrypted metadata query record to each queried node that is to be searched for data;
      using a secure pattern matching protocol to search a database of metadata records to match a query answer to the metadata query record;
      homomorphically encrypting the query answer to generate a homomorphically encrypted answer;
      verifying a query policy for the querying node and providing an outer layer of encryption to the homomorphically encrypted answer based on the query policy to generate a further encrypted answer, wherein the query policy is enforced by performing operations of:
         encrypting the query answer to the query using a one-time session key;
         using an additive secret sharing scheme, separating the session key into a number of shares equal to or bigger than a number of fields in the node's query policy; and
         for each field, the field's unique symmetric key is then used to encrypt one of the shares, whereby the querying node will only be able to recover the session key and decrypt the result if it has all of the keys for the fields in its query; and
      transmitting the further encrypted answer to the querying node, which removes the outer layer of encryption, resulting in the homomorphically encrypted answer; and
      decrypting the homomorphically encrypted answer to recover the query answer.

2. The computer implemented method as set forth in claim 1, wherein the homomorphically encrypted answer is a table of binary vectors, one per metadata record in the database that indicates whether a record matched the query and a pointer to corresponding data.

3. The computer implemented method as set forth in claim 2, wherein each node in the network is preloaded with a list of query policies for every node in the network, where each query policy is a list of metadata fields in metadata record that a particular node is allowed to query.

4. A computer program product for secure and privacy-preserving data retrieval operations in a network having a plurality of nodes, the computer program product comprising executable instructions encoded on a non-transitory computer readable medium, such that upon execution of the instructions, one or more processors perform operations of:
   receiving a query at a querying node, the query having a metadata query record with a plurality of metadata fields, and wherein the query is any of an exact query, an approximate query, a wildcard query, a substring matching query, and a range query;
   homomorphically encrypting the metadata query record to generate a homomorphically encrypted metadata query record;
   transmitting the homomorphically encrypted metadata query record to each queried node that is to be searched for data;
   using a secure pattern matching protocol to search a database of metadata records to match a query answer to the metadata query record;
   homomorphically encrypting the query answer to generate a homomorphically encrypted answer;
   verifying a query policy for the querying node and providing an outer layer of encryption to the homomorphically encrypted answer based on the query policy to generate a further encrypted answer, wherein the query policy is enforced by performing operations of:
      encrypting the query answer to the query using a one-time session key;
      using an additive secret sharing scheme, separating the session key into a number of shares equal to or bigger than a number of fields in the node's query policy; and
      for each field, the field's unique symmetric key is then used to encrypt one of the shares, whereby the querying node will only be able to recover the session key and decrypt the result if it has all of the keys for the fields in its query; and
   transmitting the further encrypted answer to the querying node, which removes the outer layer of encryption, resulting in the homomorphically encrypted answer; and
   decrypting the homomorphically encrypted answer to recover the query answer.

5. The computer program product as set forth in claim 4, wherein the homomorphically encrypted answer is a table of binary vectors, one per metadata record in the database that indicates whether a record matched the query and a pointer to corresponding data.

6. The computer program product as set forth in claim 5, wherein each node in the network is preloaded with a list of query policies for every node in the network, where each query policy is a list of metadata fields in metadata record that a particular node is allowed to query.

7. A system for secure and privacy-preserving data retrieval operations in a network having a plurality of nodes, the system comprising:
   one or more processors and a memory, the memory having executable instructions encoded thereon, such that upon execution of the instructions, the one or more processors perform operations of:
      receiving a query at a querying node, the query having a metadata query record with a plurality of metadata fields, and wherein the query is any of an exact query, an approximate query, a wildcard query, a substring matching query, and a range query;

homomorphically encrypting the metadata query record to generate a homomorphically encrypted metadata query record;

transmitting the homomorphically encrypted metadata query record to each queried node that is to be searched for data;

using a secure pattern matching protocol to search a database of metadata records to match a query answer to the metadata query record;

homomorphically encrypting the query answer to generate a homomorphically encrypted answer;

verifying a query policy for the querying node and providing an outer layer of encryption to the homomorphically encrypted answer based on the query policy to generate a further encrypted answer, wherein the query policy is enforced by performing operations of:

encrypting the query answer to the query using a one-time session key;

using an additive secret sharing scheme, separating the session key into a number of shares equal to or bigger than a number of fields in the node's query policy; and for each field, the field's unique symmetric key is then used to encrypt one of the shares, whereby the querying node will only be able to recover the session key and decrypt the result if it has all of the keys for the fields in its query; and transmitting the further encrypted answer to the querying node, which removes the outer layer of encryption, resulting in the homomorphically encrypted answer; and decrypting the homomorphically encrypted answer to recover the query answer.

8. The system as set forth in claim 7, wherein the homomorphically encrypted answer is a table of binary vectors, one per metadata record in the database that indicates whether a record matched the query and a pointer to corresponding data.

9. The system as set forth in claim 8, wherein each node in the network is preloaded with a list of query policies for every node in the network, where each query policy is a list of metadata fields in metadata record that a particular node is allowed to query.

10. The system as set forth in claim 7, wherein in transmitting the homomorphically encrypted metadata query record to each queried node that is to be searched for data, the homomorphically encrypted metadata query record is transmitted through a mobile ad-hoc network (MANET).

11. The system as set forth in claim 10, wherein in transmitting the further encrypted answer to the querying node, the further encrypted answer is transmitted through the MANET.

12. The system as set forth in claim 11, wherein the MANET is comprised of a plurality of MANET nodes, where all of the MANET nodes are configured by one offline administrative entity that preloads the MANET nodes with required credentials, and wherein each MANET node has a location determinator to determine a location of the MANET node, and wherein the MANET nodes are loosely synchronized.

13. The system as set forth in claim 12, wherein communication amongst the MANET nodes is content-centric through use of a content-centric network (CCN) stack, such that both the further encrypted answer and associated unencrypted metadata are passed to the CNN stack and through MANET nodes based on a query of the unencrypted metadata.

14. The system as set forth in claim 11, wherein the MANET is comprised of a plurality of MANET nodes, and wherein communication amongst the MANET nodes is content-centric through use of a content-centric network (CCN) stack, such that both the further encrypted answer and associated unencrypted metadata are passed to the CNN stack and through MANET nodes based on a query of the unencrypted metadata.

15. The system as set forth claim 13, wherein communication amongst the MANET nodes is content-centric such that the further encrypted answer is distributed to only those MANET nodes that have explicitly expressed an interest in the unencrypted metadata.

16. The system as set forth in claim 13, wherein communication amongst the MANET nodes is content-centric such that the further encrypted answer is distributed to all MANET nodes in the CNN stack.

* * * * *